United States Patent [19]

Kronogård

[11] Patent Number: 4,625,583
[45] Date of Patent: Dec. 2, 1986

[54] VEHICLE DRIVE PLANT

[75] Inventor: Sven-Olof Kronogård, Lomma, Sweden

[73] Assignee: AB Volvo, Goeteborgs, Sweden

[21] Appl. No.: 149,759

[22] Filed: May 14, 1980

Related U.S. Application Data

[60] Division of Ser. No. 148,217, May 9, 1980, which is a continuation-in-part of Ser. No. 844,079, Oct. 20, 1977, abandoned.

[30] Foreign Application Priority Data

Oct. 20, 1976 [SE] Sweden ................................ 7611617

[51] Int. Cl.⁴ ............................................. F16H 37/06
[52] U.S. Cl. ..................................... 74/661; 74/665 B; 74/665 E
[58] Field of Search ............ 74/665 A, 665 B, 665 D, 74/665 E, 665 P, 661, 417, 665 F, 665 G, 665 GC, 606 R; 180/54 C

[56] References Cited

U.S. PATENT DOCUMENTS

| 1,019,283 | 3/1912 | Surcouf .................................. 74/661 |
| 1,273,950 | 7/1918 | Teltzrow ....................... 180/54 C X |
| 2,000,709 | 5/1935 | Matthews .......................... 180/54 C |
| 2,155,434 | 4/1939 | Marsh .................................... 74/661 |
| 2,197,758 | 4/1940 | Daub ................................. 180/54 C |
| 2,238,615 | 4/1941 | Wolf .................................. 180/54 C |
| 2,333,611 | 11/1943 | Wolf ............................. 74/665 D X |
| 2,589,788 | 3/1952 | Fell .................................. 180/54 C |

FOREIGN PATENT DOCUMENTS

| 813632 | 9/1951 | Fed. Rep. of Germany ........ 74/661 |
| 2307016 | 8/1973 | Fed. Rep. of Germany . |
| 1803829 | 2/1978 | Fed. Rep. of Germany ........ 74/661 |
| 136851 | 11/1929 | Switzerland ...................... 74/665 B |
| 1160380 | of 0000 | United Kingdom . |
| 171534 | of 0000 | United Kingdom ............. 74/665 D |
| 154981 | 12/1920 | United Kingdom .................. 74/665 |
| 1413672 | 11/1975 | United Kingdom ............. 74/665 A |

Primary Examiner—Rodney H. Bonck
Assistant Examiner—Joseph M. Rolnicki
Attorney, Agent, or Firm—Holman & Stern

[57] ABSTRACT

A vehicle drive plant comprises at least two prime movers mounted with their shafts aligned at an interposed base block enclosing a gear train communicating the prime mover shafts with a common output shaft. The gear train may include bevel gears at the individual prime mover inputs, being coordinated by at least one intermediate bevel pinion. A spur gear communicating with a mating gear at the output shaft is then mounted at one of the bevel gears. With a four prime mover plant there may be spur gears at the prime mover inputs, the output shaft having an aligned stub shaft extension. The output shaft, as well as the stub shaft, carries a gear wheel having a cylindrical gear rim for cooperation with prime movers located to the same side of the plane of the division as the output shaft, or stub shaft, respectively. Each of last mentioned gear wheels is further united with a bevel gear and the two bevel gears are coordinated by means of at least one interposed bevel pinion. The base block may be divided in a plane perpendicular to the prime mover shafts, and transmission members of the gear train are located so as to become accessible from the plane of division, when the base block is opened.

1 Claim, 13 Drawing Figures

VEHICLE DRIVE PLANT

This application is a division of Ser. No. 148,217 filed May 9, 1980 which is a continuation of application Ser. No. 844,079, filed on Oct. 20, 1977, now abandoned and claiming priority from my Swedish application No. 76-11617-7, filed on Oct. 20, 1976.

BACKGROUND OF THE INVENTION

The present invention refers to a vehicle drive plant including two or more prime movers operating upon a common output shaft and relates to the following applications filed simultaneously herewith: Ser. No. 149,761, entitled "A Vehicle Transmission"; and Ser. No. 149,760, entitled "A Vehicle Drive System".

Considerable advantages with respect to production costs, spare part stock, as well as service and maintenance in general are obtainable if one, or a few basic types of prime movers can be combined, instead of relying upon a selection from a series of power units with stepwise increasing outputs at the units. Depending upon the power required for a specific car, you install two, three or even four of them in combination. The term prime mover will here mean any type of internal combustion engine, as well as gas turbines. There may be one standard and one supercharged version of each basic engine, the two versions being identical in most respects.

When coupling two or more prime movers to a common output shaft great care must be taken to utilize the available space in a rational manner, i.e. interconnecting the prime movers in a space saving manner, while simultaneously making the power transfer means between the prime mover inputs and the common output shaft strong and rigid, so the various components are not subjected to undue wear caused by deformations of the entity. A further consideration is that the components should be easily accessible for inspection and servicing.

It is an obvious advantage to be able to use like engines within the plant, but when mounting two such engines end to end with their shafts aligned, one has to face the problem, that the shafts of the two prime movers seemingly will rotate in opposite directions in relation to the interposed base block. In order to combine the outputs it will therefore be necessary to introduce some kind of reverse element in the gear train.

SUMMARY OF THE INVENTION

A reversing element can form part of a bevel gearing, where two bevel gear wheels at the prime mover outputs are coordinated by an intermediate bevel pinion. Such coordinating element can be fitted directly between two prime movers having their shafts aligned, one of the bevel gears being provided with an external gear ring cooperating with the output shaft. A similar, two-fold arrangement can be used when four prime movers are involved, but in the latter case it is also possible to arrange a coordinating bevel gearing at the output shaft, receiving the inputs separately from the prime movers.

An even more compact arrangement is obtainable if the torque transferring gear train includes a bowl shaped gear wheel having an internal gear rim, at each of two aligned prime movers shafts. A set of interengaging gear wheels are fitted within said bowl shaped gear wheels, one gear wheel of said set meshing with the internal gear rim of one of the bowl shaped gear wheels, and the other gear wheel of said set meshing with the internal gear rim of the other bowl shaped gear wheel.

A gear arrangement of this type will serve the same purpose as the bevel gearing in coordinating the seemingly oppositely rotating prime movers shafts, i.e. it can be fitted between two prime movers having their shafts aligned, or it can be arranged centrally at the output shaft, to take care of inputs from four prime movers.

DETAILED DESCRIPTION

Figure 1:
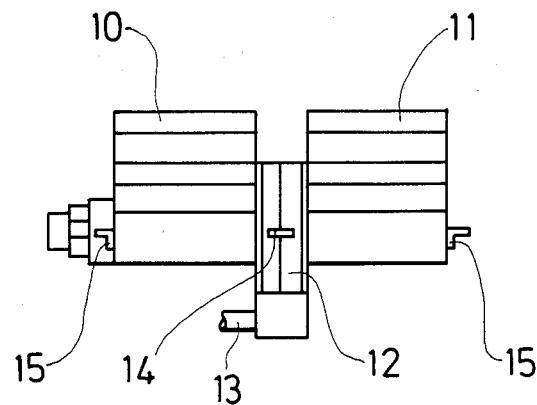
FIG. 1 very schematically shows an elevation of a vehicle drive plant comprising two internal combustion engines of the same type, connected end to end by means of a base block, FIG. 2 very schematically shows a longitudinal section through the base block.

FIG. 1 schematically shows a vehicle drive plant comprising two internal combustion engines 10 and 11, mounted end to end at an interposed base block 12. This contains a gear train for interconnecting the engines and transferring torque from their shafts to the common output shaft 13.

The base block 12 is, at its transverse sides, provided with members 14 for mounting the block in the vehicle. Either, or both engines will at the end remote from the base block be provided with an auxiliary support member 15.

The base block 12 may be formed in many ways, and may be adapted to receive two, three or four prime movers. Those may, as initially mentioned, be internal combustion engines of Otto or diesel type, or gas turbines.

Preferably one prime mover size is used in the same plant, but in the same plant it is possible to use at least one non-supercharged and at least one supercharged version.

Figure 2:
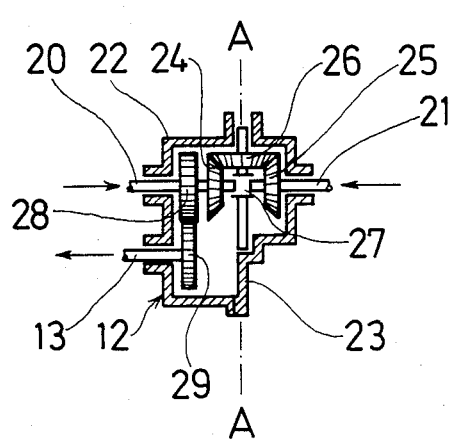

FIG. 2 schematically shows a longitudinal section through a base block 12. The housing thereof is divided in a plane A—A, perpendicularly to the axes of the shafts 20, 21 of the engines. The two portions of the housing are denoted by 22 and 23, respectively. A bevel gear 24, 25 is fitted at each shaft 20, 21, which in the very schematic arrangement are interconnected by an intermediate bevel pinion 26. The shaft of this pinion is journalled adjacent to the plane A—A dividing the housing into its two portions 22, 23.

The two engines are identical, but are turned so their output ends face each other. This means that their shafts, seemingly will rotate in opposite directions. The rotational movements of bevel gears 24 and 25 will however be coordinated by bevel pinion 26, whereby the rotational movement of shaft 21 will be reversed by, and can flow into the rotational movement of bevel gear 24.

The ends of the shafts carrying the bevel gears in this reversing gear are journalled in a bearing 27. A spur gear 28 is mounted upon shaft 20, and meshes with a second spur gear 29 at output shaft 13. The form and function of the components, which here are illustrated schematically only, will be better explained in the part of the specification belonging to FIGS. 4–13.

Figure 3:
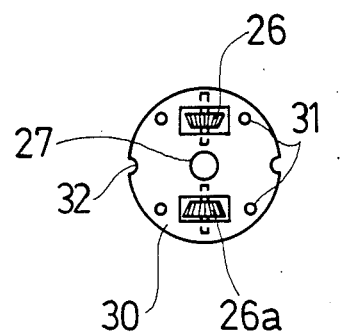
FIG. 3 shows a simple manner of mounting the coordinating gear wheels in a gear train enclosed in the base block.

FIG. 3 shows a simple way of mounting pinions 26 cooperating with the bevel gears.

A plate 30 is shaped and adapted to the bolted inbetween the portions 22, 23 of the base block housing. In openings in this plate two pinions 26, 26a are mounted so they are freely rotatable. The center of the plate is formed as, or carries a bearing 27 for the shaft ends at bevel gears 24, 25. The plate, further, is provided with bores 31 for the bolts holding the portions 22 and 23 of the casing. There are also recesses 32, which cooperate with governing pins in either portion for maintaining the plate in a correct position.

Also FIG. 3 is very schematic, but the basic arrangement will be found in the following figures.

Figure 4:
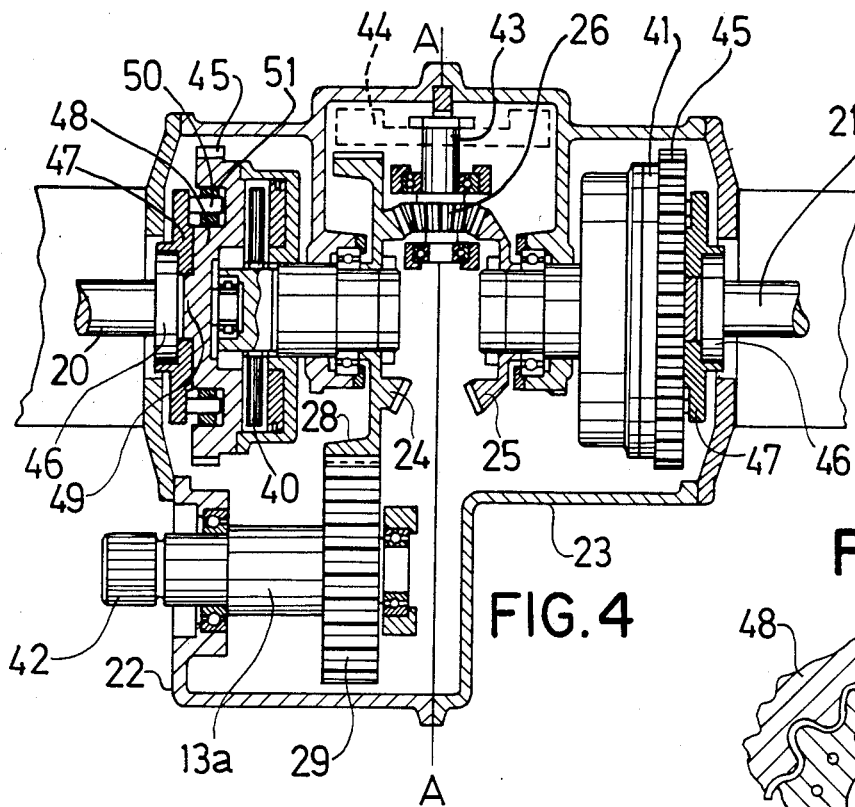
FIG. 4 shows, more in detail, one embodiment of a gear train coordinating the inputs from two aligned prime movers.

FIG. 4 shows, more in detail, how a transmission of the type shown in FIG. 2 can be arranged. The same reference numerals are used, whenever applicable. It is obviously not desirable that both engines must always be operated together, and lamella couplings 40, 41 are therefore provided between shafts 20, 21 and the associated bevel gears 24, 25. The couplings are of any well known type, and are operated in the conventional manner.

The spur gear 29 is not mounted directly upon the output shaft, but on a stub shaft 13a, the end of which extending outside the housing is provided with splines 42 for connection to a propulsion shaft.

The bevel pinion 26 has a noticeably smaller diameter than that of the bevel gears 24 and 25 and will thus rotate with a higher speed than the latter.

The shaft 43 onto which bevel pinion 26 is mounted may carry a fly-wheel, an oscillation damper or some other freely rotatable body 44, which, due to the exchange ratio, will rotate at a comparatively high r.p.m. The housings for clutches 40, 41 are provided with external ring gears 45 for cooperation with starting motors (not shown). Alternatively when a fly-wheel 44 or the like is not used, a common starting motor can be arranged at shaft 43.

The connection at the input shaft 20 or 21 includes a plate 47, securely bolted to the shaft flange 46, and centered by a projection 49 at the housing 48 of the associated clutch. The plate 47 is provided with a number of pins 50 carrying rubber bushes 51, which fit into recesses in housing 48. This embodiment provides an elastic and easily assembled torque transfer means between the input shafts and the gear train.

Figure 5:
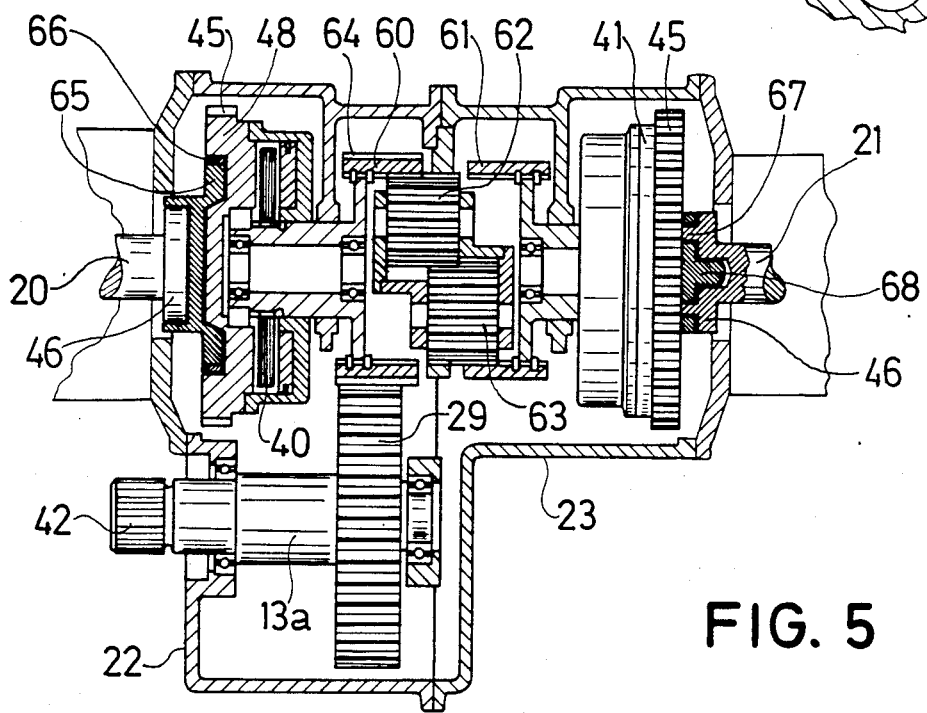
FIG. 5 shows a modification of the gear train in FIG. 4.

The embodiment according to FIG. 5 largely corresponds with that according to FIG. 4, and the same reference numerals have been used, where applicable. It has been possible to make the transmission more compact, by replacing the bevel gearing with a reversing gear comprising two bowl shaped components 60, 61 interacting by way of internal, intermediate gears 62, 63. The intermediate gears 62, 63 are so broad, that half of their length will be sufficient for interengagement, while the remainder of their extents are used for cooperation with the bowl shaped components 60, 61. One of these components, 60, is provided with an external ring gear 64 for cooperation with the driving spur gear 29.

Figure 6:
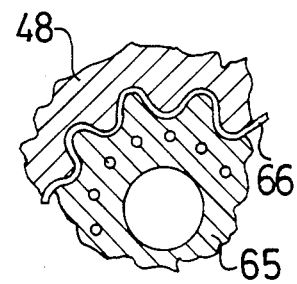
FIG. 6 shows a detail of interengaging components in FIG. 5, FIGS. 7 and 8 show transmissions corresponding to those of FIGS. 4 and 5, but where the clutches cooperate with the gear train by way of hydrodynamic torque converters.

Instead of plate 47, the left hand input has a toothed plate 65, which locks into a mating recess in housing 48. Between the two interlocking elements there is a band 66 of elastic material, for instance rubber. A detailed side view is shown in FIG. 6.

The right-hand side of FIG. 5 shows a simplified design for the gearing according to FIG. 4. Flange 46 at shaft 21 is provided with pegs 67, which with rubber bushes fit into mating bores in housing 48. The shaft is centered by a projection 68 extending from the housing into the shaft.

Figure 7:
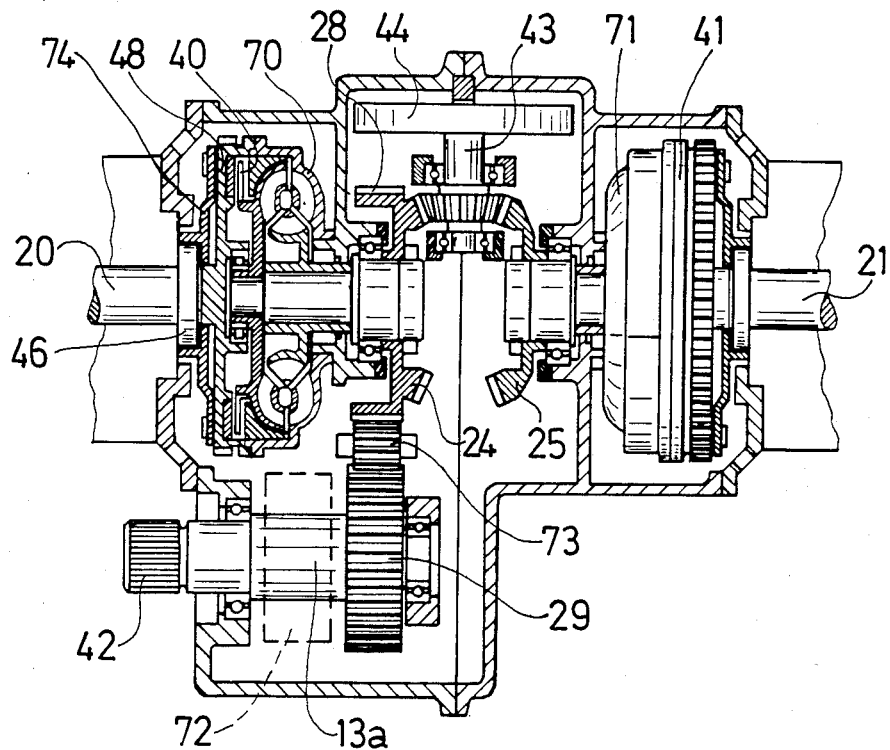
Figure 8:
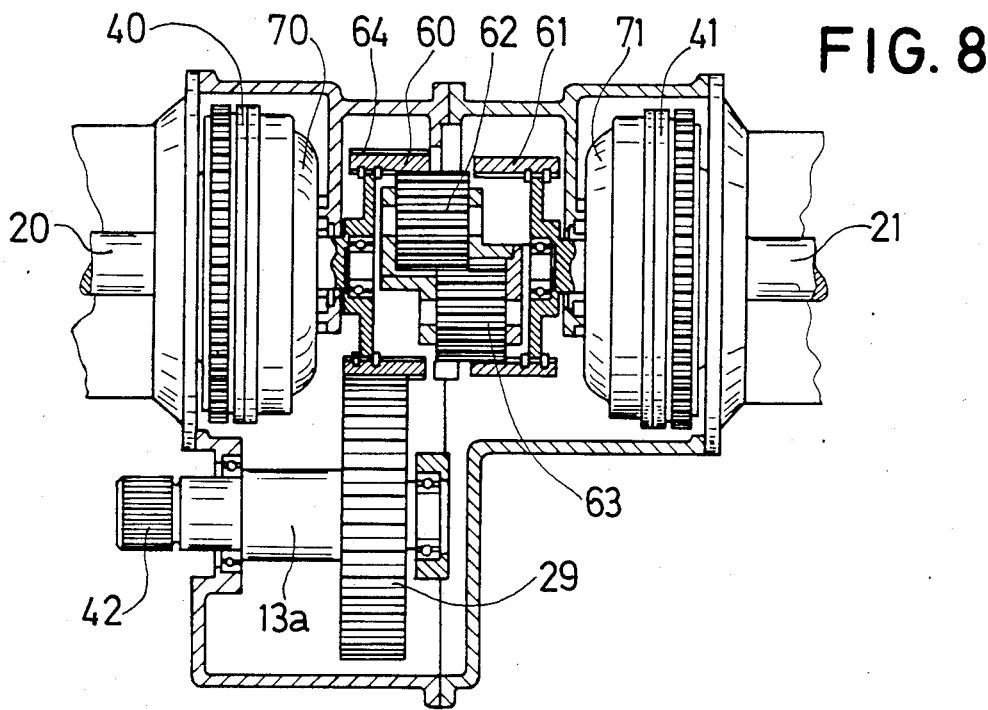

FIGS. 7 and 8 correspond to the embodiments according to FIGS. 4 and 5, respectively, but here the clutches have been supplemented with hydraulic torque converters. Those are of well-known types, and are not described in detail here. They are generally designated 70, 71.

FIG. 7 shows, in broken lines, a space for a differential 72, which is used if the output shaft 13a is extended to the opposite side of spur gear 29. FIG. 7 also shows a reversing spur gear 73 mounted between spur gears 28 and 29.

The joint between input shafts 20, 21 and associated couplings here comprises an axially elastic plate 74, which is securely bolted to shaft flange 46, or to the clutch housing 48.

The space in the lower right-hand corner of the housings in FIGS. 4–8 may be used for supplementary gearing, or a differential for power take-offs in both directions.

Figure 9:
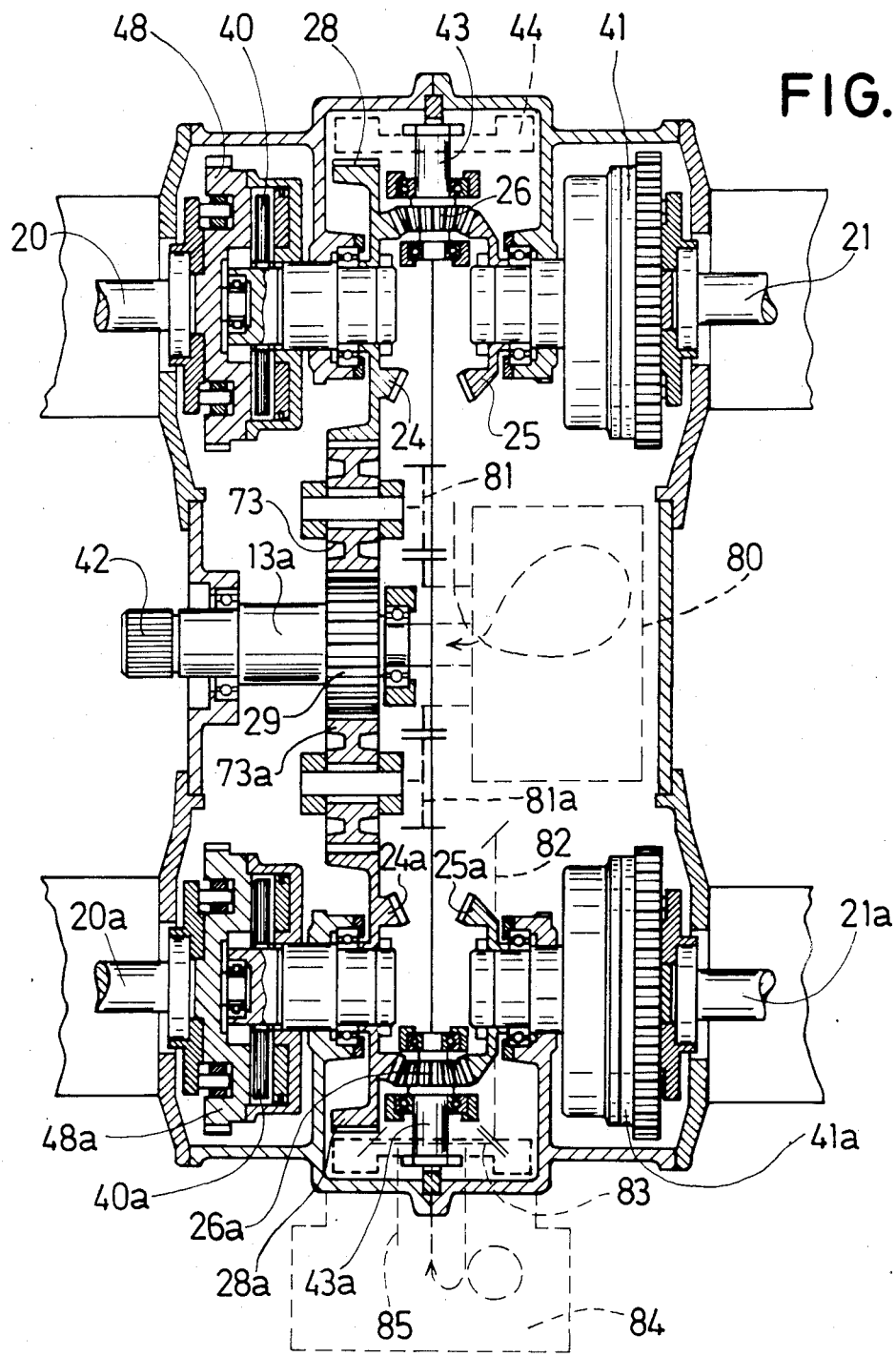
FIG. 9 shows a coordinating gear of the kind shown in FIG. 4 as used with a vehicle drive plant comprising four prime movers.
Figure 10:
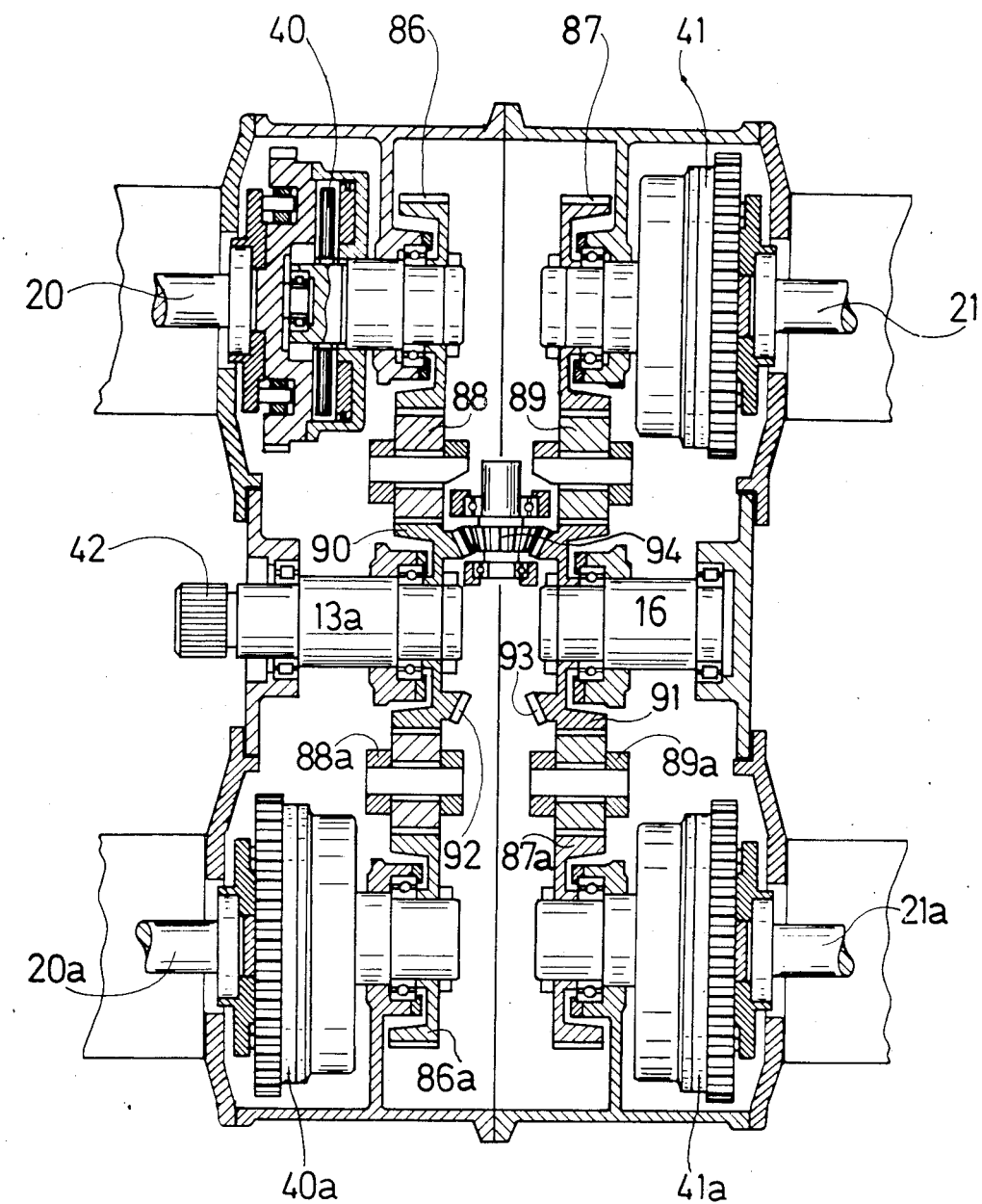
FIG. 10 shows a modification of the transmission according to FIG. 9.

FIGS. 9 to 13 show gearing arrangements, in which four engines are connected to the same base block. FIG. 9 may be considered as a twin embodiment of that of FIG. 4, and FIG. 10 is a modification thereof. The same reference numerals are used, and components in the lower half are provided with the suffix a. There are thus in FIG. 9 two reversing bevel pinions 26 and 26a, which mesh with bevel gears 24, 25; 24a, 25a and by way of external ring gears 28, 28a both drive spur gear 29 by way of intermediate gears 73, 73a.

The broken lines indicate a possible location of a torque converter 80, which in that case will be common to all engines. Such a torque converter is driven by gears 81, 81a mounted on the same shafts as intermediate gears 73 and 73a. The common spur gear 29 will be deleted in such application.

When two different types of engines, e.g. a gas turbine and a piston engine are used and fitted in axially aligned positions, it can be advantageous to have a torque converter in the power transmission from the piston engine, while none is required at the gas turbine side, if the turbine has a so-called free drive turbine, which is presupposed.

The lower part of FIG. 9 indicates an alternative for such a case. It is supposed that shaft 20a is connected to the gas turbine, and 21a to the piston engine. The bevel gear 25a is replaced by a similar gear 82 (broken lines) of greater diameter. It drives via a second bevel gear 83a a torque converter 84 by way of a hollow shaft 85. The output from the torque converter is transmitted via shaft 43a, and bevel pinion 26a to the bevel gear 24a.

In the embodiment according to FIG. 10 the input shafts 20, 21; 20a, 21a are provided with lamella clutches 40, 41; 40a, 41a of the same type as in the preceeding figure. The lamella clutches drive cylindrical gears 86, 87; 86a, 87a, which by way of intermediate gears 88, 89; 88a, 89a drive spur gears 90, 91, which are integral with bevel gears 92, 93. These are, as described before, coordinated by one or more intermediate pinions 94. Spur gear 90 is mounted upon the output shaft 13a, while spur gear 91 is mounted upon an aligned stub shaft 16.

Figure 11:
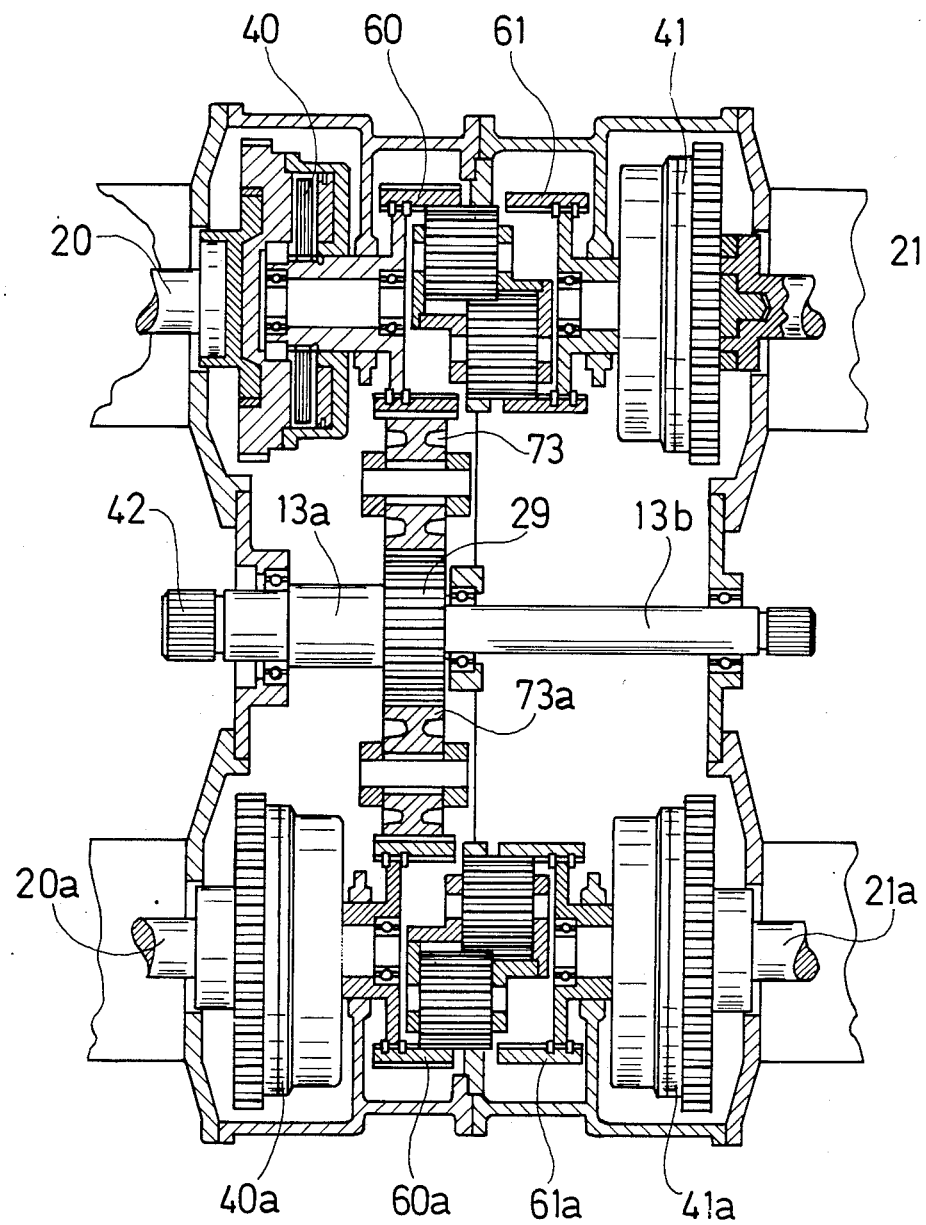
FIG. 11 shows a coordinating gear of the kind shown in FIG. 5 as used with a vehicle drive plant comprising four prime movers.
Figure 12:
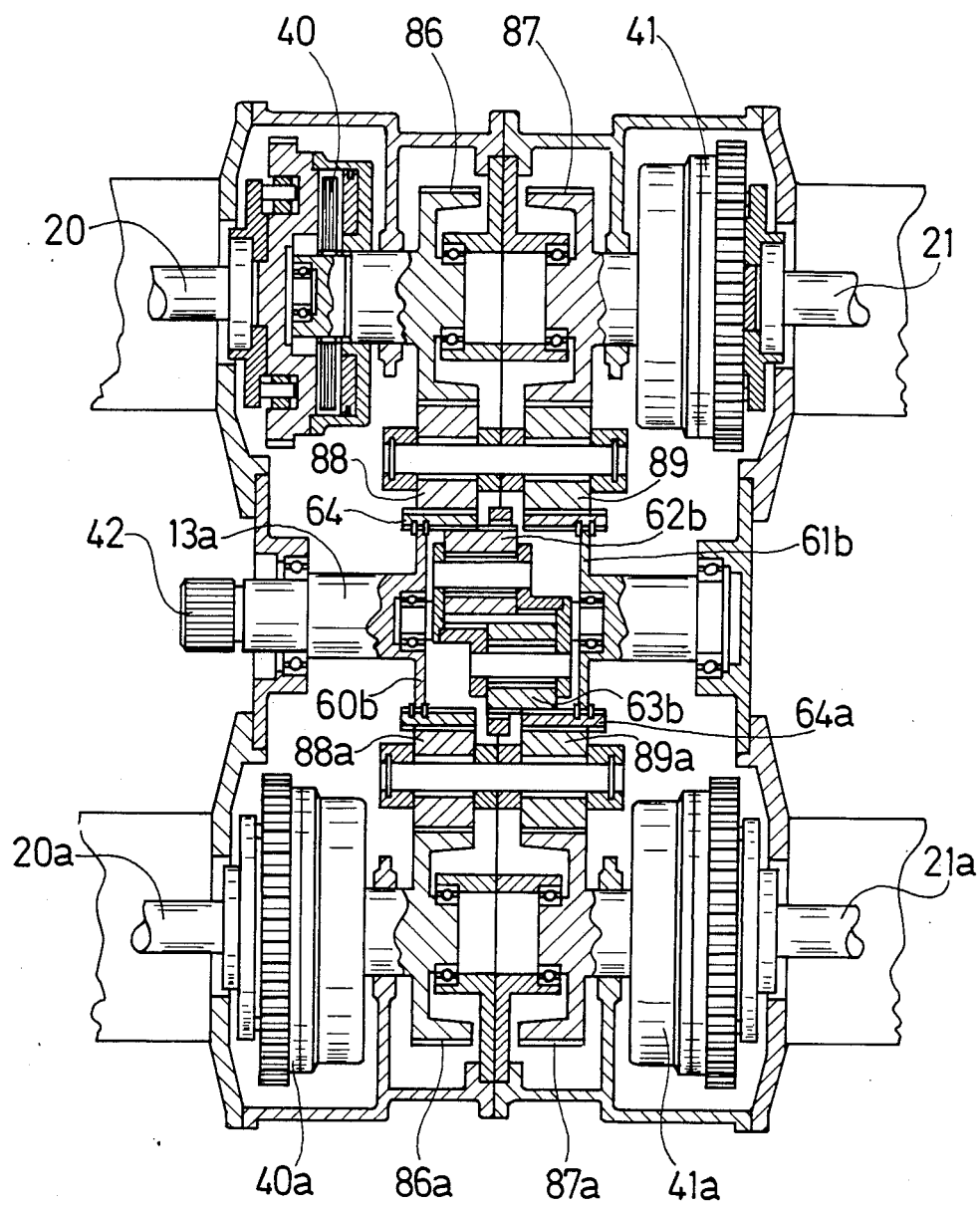
FIG. 12 shows a modification of a transmission according to FIG. 11.

FIG. 11 is a corresponding twin arrangement of FIG. 5, and FIG. 12 is a modification of FIG. 11, corresponding to that of FIG. 10.

The bowl shaped members 60, 60a of FIG. 11 drive via intermediate gears 73, 73a a common gear 29. The output shaft 13a is provided with an extension 13b for dual power take-off. There are thus two coordinating gears here.

In the embodiment according to FIG. 12 there is, as in FIG. 10, only one central coordinating gear. The components therein have the same reference numerals as in the preceeding reversing gear designs, but have the suffix b.

The power is transmitted to the central coordinating gear as in FIG. 10 by means of spur gears 86, 87, 88, 89; 86a, 87a, 88a, 89a.

Figure 13:
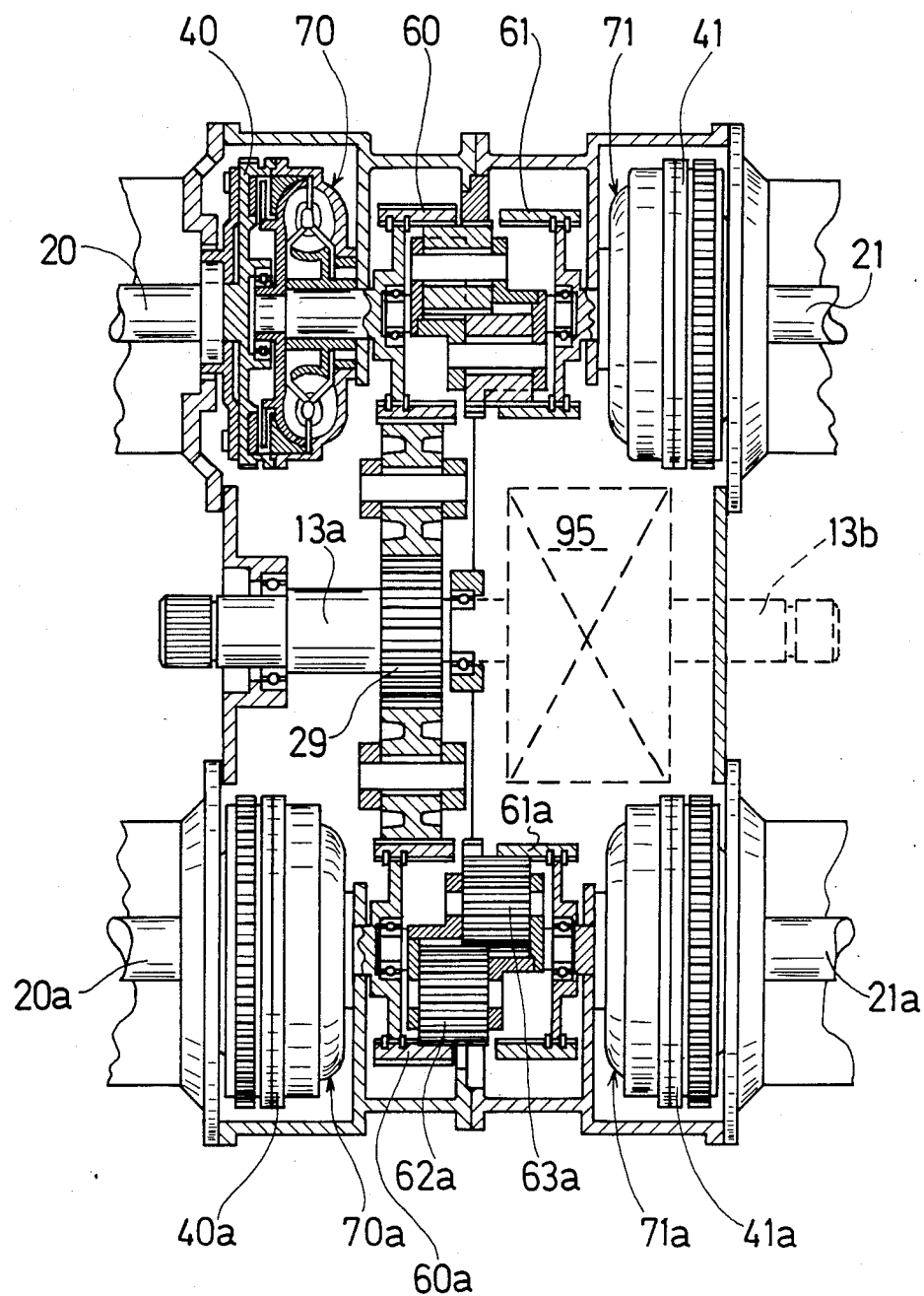
FIG. 13 shows a modified embodiment of a transmission according to FIG. 11, where the clutches cooperate with the gear train by way of hydrodynamic torque converters.

The embodiment according to FIG. 13 corresponds to that according to FIG. 11, but here the lamella clutches 40, 41, as in FIG. 7, are augmented by hydraulic torque converters 70, 71. A differential 95 is indicated by broken lines, as well as an extra power take-off 13b.

The embodiments described and shown provided an extensive picture of the different combination possibilities available, and of the gains in respect to space and simplification of parts which can be achieved. A man skilled in the art will however easily see the additional combinations possible.

The expression spur gear used above must not be understood as limiting the designs to gears having straight gear teeth. Herringbone, cycloidal teeth or any other suitable shape of the teeth may be used.

What I claim is:

1. A vehicle drive plant comprising:
   at least one pair of prime movers, each prime mover having an output end and an output shaft at said output end which rotates in a predetermined direction, said prime movers being operatively connected to a common drive shaft;
   a base block;
   oppositely disposed substantially parallel end walls in said base block;
   each end wall having means for receiving at least one of said output shafts of each pair of said at least one pair of prime movers, the output shafts of each pair of said prime movers being aligned on a common axis of rotation and parallel to said common drive shaft;
   individually operable clutch means disposed within said base block, said clutch means being operably connected to each one of said output shafts of each pair of prime movers and having a clutch output shaft;
   a gear train within said base block operably connecting said clutch output shafts to said common drive shaft,
   said gear train comprising a bevel gear wheel on each clutch output shaft,
   at least one bevel pinion meshing with said bevel gear wheels having a diameter smaller than the diameter of said bevel gear wheels,
   a first spur gear wheel integral with at least one of said bevel gear wheels, and
   a second spur gear wheel on said common drive shaft in cooperative engagement with said first spur gear wheel;
   said drive shaft comprising a stub shaft journalled at its inner end in bearings within said base block and extending through the wall of said base block and having means on the outer end thereof for connecting to a propulsion shaft;
   said base block being divided into two parts along a plane parallel to said end walls, perpendicular to said common axis of rotation of said prime mover output shafts, and including the axis of rotation of said at least one bevel pinion; and
   a flywheel mounted upon the shaft of said at least one bevel pinion within said base block.

* * * * *